United States Patent
Neburchilov et al.

(10) Patent No.: US 8,685,575 B2
(45) Date of Patent: Apr. 1, 2014

(54) AIR CATHODE FOR METAL-AIR FUEL CELLS

(75) Inventors: Vladimir Neburchilov, Vancouver (CA); Haijiang Wang, Burnaby (CA); Wei Qu, Vancouver (CA)

(73) Assignee: National Research Council of Canada, Ottawa, Ontario (CA)

( * ) Notice: Subject to any disclaimer, the term of this patent is extended or adjusted under 35 U.S.C. 154(b) by 60 days.

(21) Appl. No.: 13/501,882

(22) PCT Filed: Oct. 15, 2010

(86) PCT No.: PCT/CA2010/001673
§ 371 (c)(1),
(2), (4) Date: Apr. 13, 2012

(87) PCT Pub. No.: WO2011/044703
PCT Pub. Date: Apr. 21, 2011

(65) Prior Publication Data
US 2012/0202126 A1    Aug. 9, 2012

Related U.S. Application Data

(60) Provisional application No. 61/272,660, filed on Oct. 16, 2009.

(51) Int. Cl.
*H01M 8/22*     (2006.01)
(52) U.S. Cl.
USPC ............ 429/405; 429/523; 429/494; 429/527
(58) Field of Classification Search
USPC ................... 429/405, 523, 494, 527
See application file for complete search history.

(56) References Cited

U.S. PATENT DOCUMENTS

| | | | |
|---|---|---|---|
| 3,977,901 A | 8/1976 | Buzzelli | |
| 4,152,489 A | 5/1979 | Chottiner | |
| 4,431,848 A | 2/1984 | Greco | |
| 5,306,579 A * | 4/1994 | Shepard et al. | 429/405 |
| 5,312,701 A | 5/1994 | Khasin et al. | |
| 5,318,862 A | 6/1994 | Liu et al. | |
| 5,441,823 A | 8/1995 | Naimer et al. | |
| 6,291,090 B1 * | 9/2001 | Kuznetsov et al. | 429/535 |
| 6,368,751 B1 | 4/2002 | Yao et al. | |
| 6,632,557 B1 | 10/2003 | Curelop et al. | |
| 2004/0086774 A1 | 5/2004 | Munoz et al. | |
| 2004/0157101 A1 | 8/2004 | Smedley | |
| 2004/0229107 A1 | 11/2004 | Smedley | |
| 2007/0264550 A1 * | 11/2007 | Zhang et al. | 429/27 |

OTHER PUBLICATIONS

Martin et al., "Air Cathodes for Metal-Air Batteries and Fuel Cells"; IEEE Electrical Power & Energy Conference; 2009.
Meng et al., "Novel Pt-Free Catalyst for Oxygen Electroreduction"; Electrochemistry Communications; vol. 8, p. 588-594; 2006.

* cited by examiner

*Primary Examiner* — Jane Rhee
(74) *Attorney, Agent, or Firm* — Catherine Lemay

(57) ABSTRACT

The invention disclosed is a catalyst composition for an air cathode for use in an electrochemical cell, in particular in alkaline electrolyte metal-air e.g. zinc-air, fuel cells. The catalyst composition comprises an active material CoTMMP and silver, supported on carbon wherein the ratio of silver to CoTMPP is 1:1 to 2.4:1. Optional ingredients include a hydrophobic and a hydrophobic bonding agent, $MnO_2$, WC/Co or both. The catalyst composition is supported on microporous support layer and nickel foam or mesh to form an air cathode.

16 Claims, 3 Drawing Sheets

AIR CATHODE FOR METAL-AIR FUEL CELLS

This application is a National Stage application of PCT Application PCT/CA 2010/001673 filed Oct. 15, 2010 which claims benefit of US Provisional Application 61/272,660 filed Oct. 16, 2009.

FIELD OF THE INVENTION

This invention relates to electrochemical cells, and in particular to a catalyst composition for an air cathode for use in alkaline electrolyte metal-air e.g. zinc-air, fuel cells (ZAFCs). An air cathode and a method for making same are also provided.

BACKGROUND OF THE INVENTION

Typical ZAFCs include an alkaline electrolyte, a replaceable supply of zinc at the anode, an air cathode, which typically includes a non-precious metal catalyst, and a polymer separator. ZAFCs require refuelling with fresh alkaline electrolyte and zinc supply, and removal of reaction products such as zinc oxide and zincates.

In general, the current air cathodes available for metal-air and direct alcohol fuel cells do not meet the requirements of catalytic activity, durability and cost that would provide widespread commercialization of these devices.

The prior art includes various catalyst compositions including $CoTMPP+MnO_2/C$, $CoTMPP+Co_3O_4+MnO_2/C$ (U.S. Pat. No. 7,097,933 (2003)), Ag—WC/C (Meng, P. K. Shen. *Electrochem. Communications.* 8 (2006) 588-594), $AgMnO_4+5-10\% MnO_2$ (E. Curelop et al., U.S. Pat. No. 6,632,557 (1999)). Also, the combination of WC, Co and Ag with CoTMPP was developed to form complex compositions of bifunctional electrodes for rechargeable zinc air fuel cells, such as $(CuSO_4+NiWO_4+WC+Co)/C$ (U.S. Pat. No. 3,977,901 (1976), U.S. Pat. No. 4,152,489 (1979)), 46% (3% Ag+7% $FeWO_4$+7% WC+12% Co+7% NiS)/C (U.S. Pat. No. 5,318,862 (1994)), $(AgCoWO_4+WC+WS_2+NiS+10-15\% Co)/C+20\%$ PTFE (U.S. Pat. No. 4,431,848 (1982)), [(0.3-2%) CoTMMP/C+(1-4%) Ag+(1-7%) NiS (or $WS_2$)+(4-10%) $LaNi_{1-x}Co_x$+(18-32%) $Co_xO_y$]+[(1-20%) WC+(1-20%) Co+(1-7%) $FeWO_4$ (or $CoWO_4$)/C (AB-50)] (U.S. Pat. No. 5,306,579 (1994)).

It is noted that the latter reference includes a complex combination of numerous catalytically active materials, including CoTMPP, Ag, WC and other additives, but in a bifunctional electrode for a secondary rechargeable ZAFC cell.

Additionally, US published patent application no. 20040086774 (Munoz et al) discloses fuel cell catalyst compositions including combinations of CoTMPP, Ag and $MnO_2$. However, this is no more than a non-enabled wish list of such compositions. Also, a higher performance cathode (CoTMPP/C with current density $j=500$ mA/cm$^2$ at 1 V discharge in KOH) is disclosed in W. Yao et al., U.S. Pat. No. 6,368,751 (2002). However, this patent did not show the stability of this active electrode, the concentration of electrolyte in the cell and the pyrolysis temperature of CoTMPP. It showed only general heat treatment at 350° C. for the melting of the Teflon® bonding agent. It is known that non-heat treated catalysts have higher surface area and performance but low durability.

The main limitations of the state-of-the-art air cathodes for ZAFCs are as follows:

Low performance of ZAFC in 30% KOH (single cell voltage <1V at current density of 280 mA/cm$^2$)
Insufficient durability
Insufficient corrosion and liquid penetration resistance
Insufficient bonding between support (specifically metal foam) and composite materials for a more robust electrode structure

SUMMARY OF THE INVENTION

According to one aspect of the invention, a catalyst composition for an air cathode for use in alkaline electrolyte metal-air electrochemical cells, preferably primary fuel cells e.g. ZAFC fuel cells, is provided, comprising as active material CoTMPP and Ag supported on carbon, and optionally including $MnO_2$ and/or WC/Co and hydrophilic and hydrophobic binding agents e.g. Nafion® and PTFE, respectively.

The catalyst composition is coated on a support/substrate e.g. Ni foam or mesh, to form the air cathode, although it will be appreciated by those skilled in the art that other manufacturing methods could also be used, such as screen printing and rolling methods. It will be appreciated that the air cathodes of the invention are useful in both primary and secondary alkaline metal-air fuel cells.

Although the preferred metal is zinc, it will be appreciated that other metals including Fe, Mg and Al could also be employed. It will also be appreciated by those skilled in the art that the catalysts according to the invention can be used for any alkaline electrolyte based battery/fuel cell.

In one embodiment of this aspect of the invention, a catalyst composition for an air cathode for use in alkaline electrolyte metal-air electrochemical cells, preferably primary fuel cells e.g. ZAFC fuel cells, is provided, comprising as active material 3-15 wt % of CoTMPP, 3-20 wt % of Ag, 50-80 wt % of carbon, 0 to 4 wt % of $MnO_2$ and 0-20 wt % of WC (88 wt %)/Co(12 wt %). Optionally included in the catalyst composition are hydrophilic/hydrophobic binding agents e.g. 3-20%/w of both Nafion® (a perfluorosulfonic acid material) and Teflon® (PTFE), respectively.

The optimal balance of Nafion® and Teflon® concentrations is responsible for the conductivity, ratio between macro/micro porosity and mass transport and water management.

In Table 1, the 3-20% range, for both Nafion® and Teflon®, was selected according to the following data:
at Teflon® >20% we have low conductivity
at Teflon® <3% hydrophilicity is not enough
at Nafion® >20 we observe decreasing of porosity and active surface area of ORR catalyst
at Nafion® <3% we have insufficient conductivity We propose three preferred catalytically active material compositions for air cathodes, as follows.
(i) (Ag+CoTMPP)/C, (ii) (Ag+CoTMPP+$MnO_2$)/C, and (iii) (Ag+CoTMPP+WC+Co)/C.

CoTMPP is a non-precious component that has high activity in KOH but not enough stability. Ag has better stability, and conductivity than CoTMPP in concentrated alkali, and WC and $MnO_2$ have higher durability in alkaline solution than CoTMPP. Thus, a more preferred composition of catalytically active material for an air cathode in the present invention is (Ag+CoTMPP+$MnO_2$)/C. (See the Table 1).

A basic ratio of Ag:CoTMPP=2.4:1 was selected for this invention. The best ratio range for Ag:CoTMPP is presented in Table 2 as 1:1 to 2.4:1. It is noted that the ratio Ag:CoTMPP>2.4:1 is not cost effective, and when the ratio is <1:1, degradation of performance begins to occur. (See Table 2).

Also, higher content of Ag provides higher stability in alkali. We have also found that the long term operation of the binary catalytic matrix, (Ag+CoTMPP)/C, could be improved by the addition of active and durable tungsten carbide with cobalt and/or $MnO_2$ to provide a ternary catalyst.

According to another aspect of the present invention, we provide an air cathode for use in alkaline electrolyte metal-air electrochemical cells, preferably primary fuel cells e.g. a ZAFC fuel cell, comprising
(a) a support, e.g. Ni foam or mesh,
(b) a microporous layer (MPL), and
(c) a catalytic layer, wherein the catalyst composition is as described above.

Preferably, the MPL is in the form of a paste, comprising 70%/w of C and 30%/w PTFE (Teflon®), which provides a carbon loading of 18 mg/cm² on the support.

The air cathodes according to the invention can be used in any commercial metal-air fuel cells such as ZAFC, Mg-AFC and Fe-AFC, preferably primary fuel cells, for electrical scooters, autonomic power generators, back-up systems, mobile electronics and hearing aid applications.

According to another aspect of the present invention, we provide a process for making an air cathode according to the invention, comprising
(a) rolling of a coating paste to form a microporous layer (MPL) on a Ni foam or mesh support,
(b) cold pressing,
(c) applying a catalyst on the MPL, wherein the catalyst is as described herein, and
(d) hot pressing to form the air cathode.

DETAILED DESCRIPTION OF THE INVENTION

We propose in Table 1, the following novel (CoTMPP+Ag)-based compositions, which have superior performance as a catalyst for air cathodes for ZAFCs:

TABLE 1

Concentration range of the ingredients in the catalysts according to the invention (wt. %)

| Ag | CoTMPP | 88% WC + 12% Co | $MnO_2$ | C | Teflon | Nafion |
|---|---|---|---|---|---|---|
| 3-20 | 3-15 | 0-20 | 0-4 | 50-80 | 3-20 | 3-20 |

Several preferred compositions of the catalysts according to the invention are included in Table 2.

TABLE 2

| | Catalyst composition, wt % | | | | | | | Performance, Electrode potential (V) at j = 280 mA/cm² in 30% KOH in ZAFC single cell with circulating electrolyte |
|---|---|---|---|---|---|---|---|---|
| Sample | Ag | CoTMPP | 88% WC + 12% Co | $MnO_2$ | C | Teflon | Nafion | |
| 1 | 8.5 | 3.5 | — | | 76.0 | 8.5 | 3.5 | 1.0 |
| 2 | 8.5 | 3.5 | 3.5 | | 72.5 | 8.5 | 3.5 | 0.9 |
| 3 | 7.0 | 7.0 | — | 2 | 73.0 | 6.0 | 5.0 | 0.95 |
| Commercial Air cathode | | | | | | | | 0.9 |

It is noted that $MnO_2$ is more stable than CoTMPP and Ag in alkaline solution, but it is less ORR active. Accordingly, at its concentration of more than 4% we can expect decreasing of ORR activity, but at $MnO_2$<1% we probably will not have the effect of durability improvement.

Figure 3:
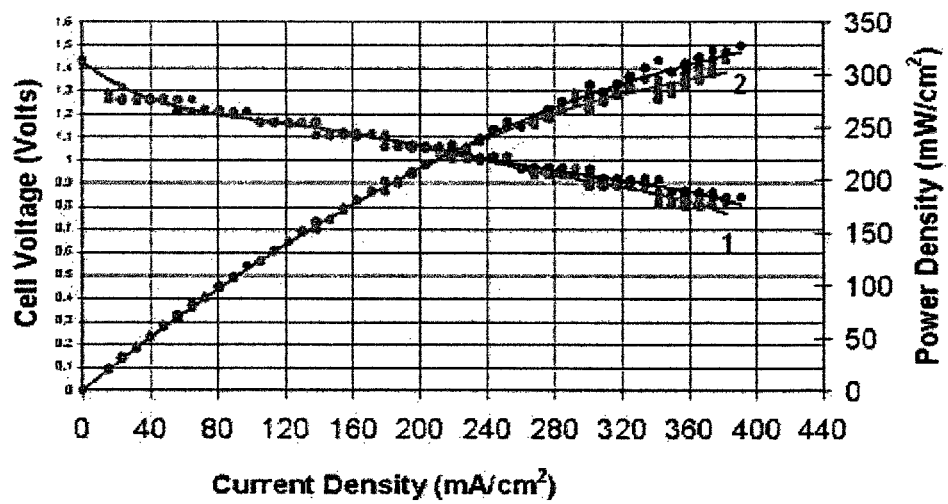
FIG. 3 is a graph showing the polarization curves (1) (several reproducible curves during the 1st hour of operation) and the power-current density curves (2) of a single zinc air fuel cell using a commercial air cathode that uses a silver based catalyst composition.
Figure 4:
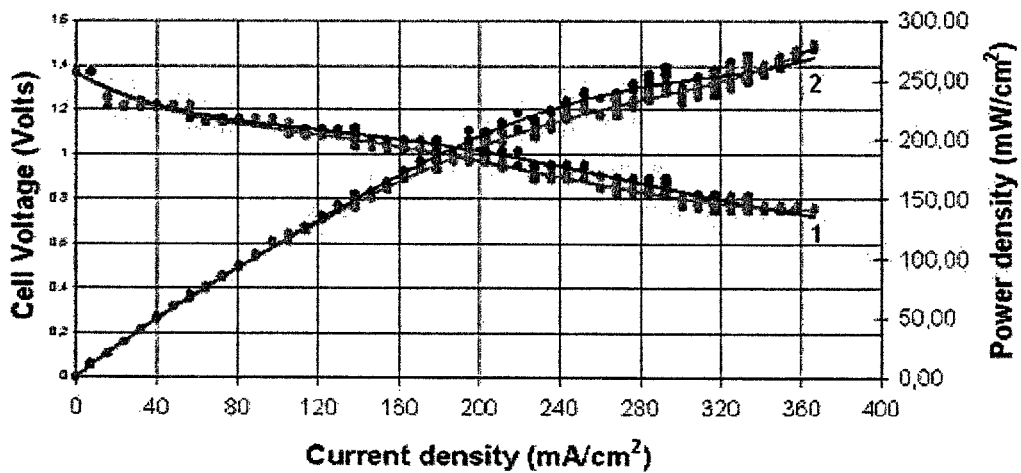
FIG. 4 is a graph showing the polarization curves (1) (several reproducible curves during the 1st hour of operation) and the power-current density curves (2) of a single zinc air fuel cell using a catalyst composition comprising 7% Ag+7% CoTMPP+2% $MnO_2$+3% Teflon®+5% Nafion®+76% C, according to the invention.

The developed novel composition, (Ag+CoTMPP)/C (sample 1, Table 2), for ZAFC air cathodes, demonstrates superior stable performance (E=1V at j=280 mA/cm² (See FIG. 1) against one of the best air cathodes on the market (E=0.9V at j=280 mA/cm²) (See FIG. 3). The modification of the composition of (Ag+CoTMPP)/C through the addition of the more corrosion stable $MnO_2$, (sample 3, Table 2) did not significantly decrease the performance (E=0.95V at j=280 mA/cm² (FIG. 4). Additionally, this performance is still higher than the performance of the commercial electrode (FIG. 3). The addition of WC+Co to Ag—CoTMPP/C (sample 2, Table 1) was used for durability improvement but the activity remained the same (see FIG. 5) as for the commercial air cathode (see FIG. 3).

The addition of WC—Co was made with a view to increase the ORR activity of (Ag+CoTMPP)/C matrix, as ORR activity of (Ag+WC)/C was higher then Ag/C (from literature).

However, we got the low performance. Regardless, the cathode #2 shows the same performance as the commercial cathode.

Figure 1:
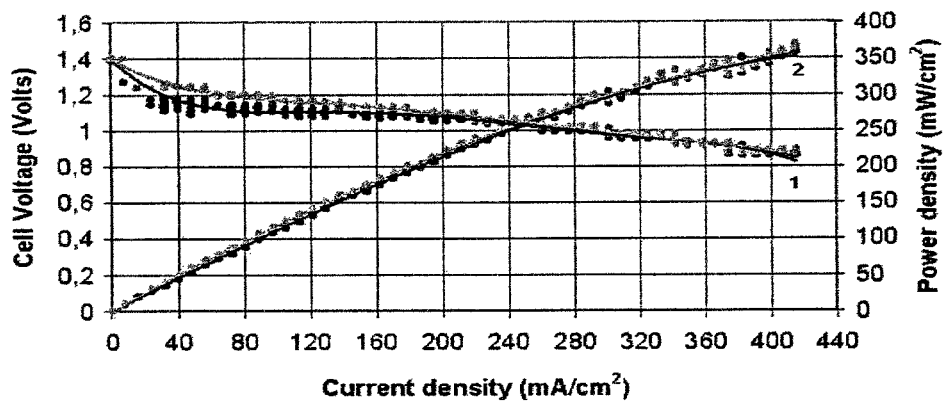
FIG. 1 is a graph showing the polarization curves (1) (several reproducible curves during the 1st hour of operation) and the power-current density curves (2) of a single zinc air fuel cell using a catalyst composition comprising 8.5% Ag+3.5% CoTMPP+76% C+8.5% Teflon®+3.5% Nafion®, according to the invention.
Figure 2:
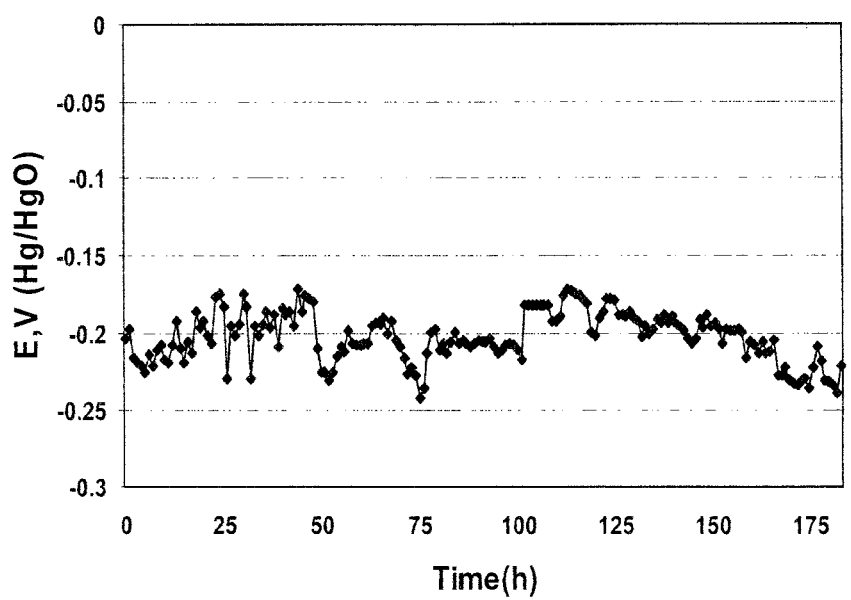
FIG. 2 shows the durability test results of the air cathode using the catalyst composition comprising 8.5% Ag+3.5% CoTMPP+76% C+8.5% Teflon®+3.5% Nafion®, according to the invention.

FIG. 1 shows the polarization curves (1) (several reproducible curves during the 1st hour of operation) and the power-current density curves (2) of a single zinc air fuel cell, using a catalyst composition comprising 8.5% Ag+3.5% CoTMPP+76% C+8.5% Teflon+3.5% Nafion on MPL in 30% KOH electrolyte at T=20° C., with flowing air and circulating electrolyte. The active surface area of the cell is 50 cm². The load of CoTMPP and Ag in the catalyst layer is 0.4 and 1 mg/cm², respectively, and the load of carbon in the MPL is 18 mgC/cm². Anode used is Zn pellets. This air cathode electrode showed the stable potential of about 0.2V (vs. HgO/Hg) during the durability test for 183 hours as shown in FIG. 2. The durability test was carried out in a 5 cm² single cell using the same air cathode and a nickel foam anode, and Celgard 5550 as the separator. Test was done at T=20° C. and j=100 mA/cm². At the end of the test, the air cathode does not show signs of degradation. Failure of the separator prevented further test.

FIG. 3 shows the polarization curves (1) (several reproducible curves during the 1st hour of operation) and the power-current density curves (2) of a single zinc air fuel cell, using a commercial silver based air cathode in 30% KOH electrolyte) at T=20° C., with flowing air and circulating electrolyte. The active surface area of the cell is 50 cm². Anode is Zn pellets.

FIG. 4 shows the polarization curves (1) (several reproducible curves during the 1st hour of operation) and the power-current density curves (2) of a single zinc air fuel cell, using a catalyst composition, comprising 7% Ag+7% CoTMPP+2% $MnO_2$+3% Teflon+5% Nafion+76% C. Measurement was carried out in 30% KOH electrolyte solution at T=20° C., with flowing air and circulating electrolyte. The active surface area of the cell is 50 cm². The load of CoTMPP and Ag in the catalyst layer was 0.4 mg/cm² each and the load of carbon in the MPL was 18 mgC/cm². Anode was Zn pellets. Catalyst ink was prepared using a 5% Nafion solution and sprayed onto the surface of the MPL to form the catalyst layer.

Figure 5:
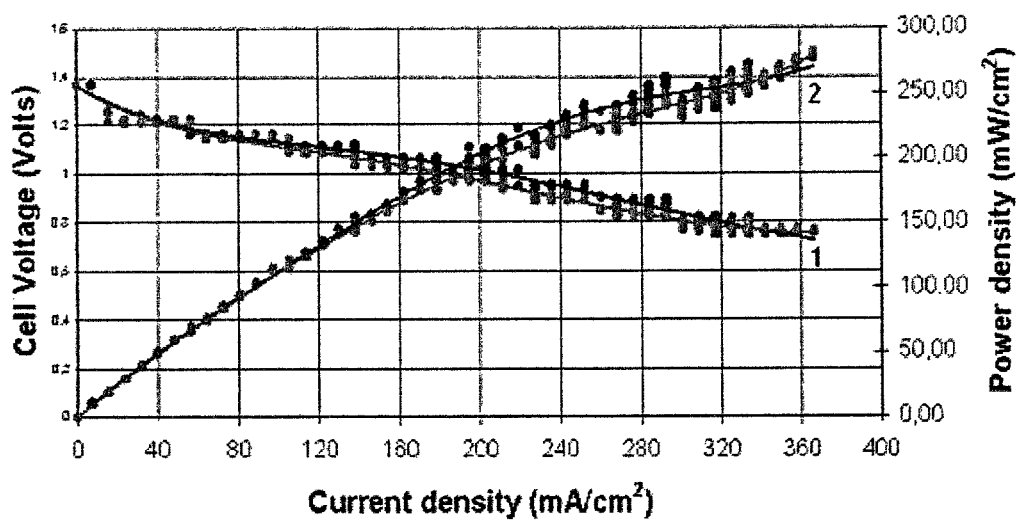
FIG. 5 is a graph showing the polarization curves (1) (several reproducible curves during the 1st hour of operation) and the power-current density curves (2) of a single zinc air fuel cell using a catalyst composition comprising 8.5% Ag+3.5% CoTMPP+3.5% (88% WC+12% Co)+72.5% C+8.5% Teflon®+3.5% Nafion®, according to the invention.

FIG. 5 shows the polarization curves (1) (several reproducible curves during the 1st hour of operation) and power-current density curves (2) of a single zinc air fuel cell, using a catalyst composition, comprising 8.5% Ag+3.5% CoTMPP+3.5% (88% WC+12% Co)+72.5% C+8.5% Teflon+3.5% Nafion. The measurement was carried out in 30% KOH electrolyte solution at T=20° C., with flowing air and circulating electrolyte. The active surface area of the cell was 50 cm². The load of CoTMPP and Ag in the catalyst layer was 0.4 and 1 mg/cm², respectively, and the load of carbon in the MPL was 18 mgC/cm². Anode was Zn pellets. Ag catalyst was prepared with Ag salt.

Method for Fabrication of Air Cathode Coatings

Generally, the method for fabrication of air cathodes according to the invention includes 4 steps:
1. Rolling of the paste of microporous layer comprising 70% C:30% PTFE (carbon load 18 mg/cm²) onto a Ni foam support
2. Cold pressing
3. Spraying catalytic ink on the MPL, and
4. Hot pressing to form the air cathode.

The air cathode can also be produced by other methods, such as screen printing, known to a person skilled in the art. The use of hydrophilic binding agents such as Nafion® etc and hydrophobic binding agents including but not limited to fluorinated ethylene propylene, polypropylene or polytetrafluoroethylene, in catalyst compositions allows to maintain an appropriate hydrophilic/hydrophobic balance in the catalyst.

The details of procedures for catalyst and MPL fabrication are shown in Table 3.

TABLE 3

Fabrication of microporous layer (MPL)

| Stage | 1. MPL powder | 2. MPL |
|---|---|---|
| Raw Materials | Carbon black Vulcan ® XC72 (Cabot) PTFE suspension 60% (Aldrich) | |
| MPL composition | MPL1: 70% C + 30% PTFE or MPL2: (70% XC72R + 30% BP2000): 30% PTFE | 70% C + 30% PTFE |
| Solvent | IPA (isopropanol):$H_2O$ = 1:1 | IPA:$H_2O$ = 1:1 |
| Dispersion | Sonicator settings: $t_{on}$:$t_{off}$= 0.5 s:1 s, 20 W | Sonicator settings: $t_{on}$:$t_{off}$= 0.5 s:1 s, 20 W |
| Evaporation T° C./min | 90° C./30 min | 90-100° C./30 min |
| Grinding | 2 min at 25000 rpm | |
| Paste formation | | 2 g of bonded and grinded MPL powder + 10-13.5 ml IPA:$H_2O$ = 1:1 (10 ml for two-step hot press, 13.5 ml for one-step hot press) |
| Coating | | Manual pressing of wet MPL paste on Ni foam. Roll wet MPL paste on the template to a thickness of 1 mm. |
| Cold press | | For Ni mesh current collector: 20° C., 200 lb/cm², 3 min or For Ni foam current collector: 20° C., 300 lb/cm², 3 min |
| Hot press | | 320° C., 370 lb/cm², 3 min (T of bottom plate: 20° C., T of top plate: 320° C.) |
| Control of composition, thickness, hydrophobic properties, air permeability | | EDX, contact angle, Gurley test |

DETAILED DESCRIPTION OF THE PREFERRED EMBODIMENTS

The air cathode comprises the three main elements:
Support (Ni foam or mesh)
Micro porous layer (MPL)
Catalytic layer A process for making an air cathode for use in an alkaline electrolyte metal-air electrochemical cell, comprises fabrication of microporous layer (MPL) by dispersing carbon black and Teflon® in IPA/$H_2O$ and rolling of the formed paste on a substrate/support e.g. Ni foam or mesh, dissolving a catalytically active material e.g. CoTMPP in a solvent e.g. acetone, to form a solution, dispersing carbon e.g. carbon black, in the solution, heat treating the dispersion so formed to form a catalytic ink, and spraying the catalytic ink on the MPL, and hot pressing to form the air cathode.

1. Pre-treatment of Ni Support

In some embodiments of the invention, the Ni foam or mesh support is pre-treated.

Pretreatment of Ni Support Includes:
Etching in 10% HCl at T=20° C.
Washing in distilled water in ultrasonic bath till reaching pH of 7
Degreasing in ethanol
Drying in a vacuum oven at 40° C.

2. MPL Fabrication 2.1 Powder Preparation

The hydrophobic MPL powder was prepared by dispersing Carbon Black (Vulcan® XC72R or 70% Vulcan® XC72R+ 30% BP2000) and a Teflon® solution with Teflon® concentration in the range of 30-50% (optimal 30%) in IPA/$H_2O$ (1:1) mixture by ultrasonic mixing for 1 hour with the sonicator set at $t_{on}:t_{off}$=1 s:2 s and power of 20W. The concentration of the Teflon® solution can be as high as 60-80 wt. % depending on the required MPL hydrophobicity. Sufficient hydrophobicity of MPL can be achieved at the Teflon® concentration of 30% w/w.

The final fine dispersed ink was evaporated at T=90° C. The dry residue was ground for 2 min at 25000 rpm (grinder IKA) to obtain the MPL powder.

2.2 Coating of MPL

The MPL protects the air cathode from electrolyte leakage and provides high porosity for air transport. The prepared viscous paste was immediately put on the surface of the Ni foam. The paste was coated onto the support surface, which is constrained by a Teflon® template with adjustable size and thickness (equal to the required one for MPL). The paste was distributed evenly by a rolling technique using a Teflon® roller. The Ni foam with wet MPL was cold pressed at 100-300 lb/cm² for 3-10 min at T=20° C. After cold pressing, the paste substantially completely penetrates through the Ni foam and black paste should be visible on an opposite side of the Ni foam. Immediately after cold pressing, hot pressing was used at T=300-340° C. (optimal T=320° C.) for 3 min at pressure 300-400 (optimal 370) lb/cm² to form the air electrode. It is noted qualitatively that the MPL doesn't have cracks. The carbon loading in MPL was 15-25 (optimal 18 $mg_c/cm^2$).

3. Catalyst Layer Coating 3.1 Catalyst Powder Preparation

The catalyst powder 500 mg CoTMPP (Sigma Aldrich) was dissolved in 70 ml acetone, using an ultrasonic probe treatment in (Sonicator 3000 (Misonix)) 0.5 s On:1 s Off with thermal control (to avoid heating over 40° C.) with stirring until the dissolution is complete. The Carbon Black Vulcan XC72R was dispersed in CoTMPP solution (1 g carbon black in 20 ml solution) and at an ultrasonic probe treatment 0.5 s On:1 s Off and stirring for 2-6 hours. The increase of dispersion time will increase the adsorption of CoTMPP on the carbon surface. The resulting suspension was heated with stirring and T=80° C. until formation of dried powder occurs. The powder was ground for 2 min at 25000 rpm and additionally dried in a vacuum oven at 100° C. for 1 hour. Finally, the fine powder was heat treated at T=800° C. for 1 hour in nitrogen or 10% hydrogen+90% nitrogen. The oven was first purged at 20° C. till 0.5-1 vol. % oxygen. The powder CoTMPP/C was mixed with commercial Ag/C and MPL powder (70% C:30% PTFE) in required ratio and blended at 25000 rpm. The prepared powder was dispersed in 50% IPA with Nafion® (3-8% of solid) for 3 hours with use of ultrasonic probe to form an ink. This ink was sprayed onto the MPL with an automated sprayer, and hot pressed to form the air electrode.

A modification of this method was also used. In this embodiment, the catalyst powder CoTMPP/C, was dispersed in a solution of $AgNO_3$ using an ultrasonic treatment for 3 hours. The reduction of the impregnated salt, $AgNO_3$, was carried out by hydrazine at pH 11 for 12 hours while stirring. The obtained powder was washed in distilled water and dried at 80° C. The preparation of the ink and its spraying was the same.

We Claim:

1. A catalyst composition comprising as active material CoTMPP and silver, supported on carbon, wherein the ratio of silver to CoTMPP is 1:1 to 2:4:1, comprising 3-15%/w CoTMMP, 3-20%/w silver, 0-20%/w 88% WC/12% Co, 0-4%/w $MnO_2$, 50-80%/w carbon, 3-20%/w PTFE and 3-20%/w of a perfluorosulfonic acid material.

2. The composition of claim 1, comprising 3.5%/w CoTMMP, 8.5%/w silver, 76.0%/w of carbon, 8.5%/w PTFE and 3.5%/w of a perfluorosulfonic acid material.

3. The composition of claim 1, comprising 3.5%/w CoTMMP, 8.5%/w silver, 3.5%/w 88% WC/12% Co, 72.5%/w carbon, 8.5%/w PTFE and 3.5%/w of a perfluorosulfonic acid material.

4. The composition of claim 1, comprising 7%/w CoTMMP, 7%/w silver, 2%/w $MnO_2$, 73.0%/w carbon, 6%/w PTFE and 5%/w of a perfluorosulfonic acid material.

5. An air cathode for an electrochemical cell, comprising:
    (a) A catalyst support,
    (b) A microporous support layer (MPL), and
    (c) A catalytic layer, wherein the catalyst composition is that claimed in claim 1.

6. The air cathode of claim 5, wherein the catalyst support comprises nickel foam or mesh.

7. The air cathode of claim 6, wherein the MPL comprises carbon and PTFE.

8. The air cathode of claim 7, wherein the carbon is carbon black.

9. The air cathode of claim 8, wherein the MPL comprises 70%/w of carbon black and 30%/w of PTFE.

10. The air cathode of claim 9, wherein the electrochemical cell is a primary or secondary alkaline electrolyte metal-air fuel cell.

11. The air cathode of claim 9, wherein the electrochemical cell is a primary or secondary zinc-air fuel cell.

12. A method for making an air cathode for an electrochemical cell, comprising:
    (a) Rolling of a coating paste to form a microporous support layer (MPL) on a catalyst support,
    (b) Cold pressing,
    (c) Applying a catalyst composition on the MPL, wherein the catalyst composition is that claimed in Claim 1, and
    (d) Hot pressing to form the air cathode, wherein the air cathode is that claimed in Claim 5.

13. The method of claim 12, wherein step (a) the MPL comprises carbon and PTFE and is formed by dispersing carbon and PTFE in a mixture of isopropanol and water, wherein step (b) cold pressing a catalyst support with the wet MPL, and wherein following step dissolving the catalytically active material in a solvent to form a solution, dispersing carbon in the solution and heat treating the dispersion so formed to form a catalytic ink, and wherein step (c) the catalytic ink is sprayed on the MPL, and wherein step (d) the catalyst support, the MPL and the catalytic ink are hot pressed to form the air cathode.

14. The method of claim 13, wherein the carbon is carbon black.

15. The method of claim 14, wherein the MPL comprises 70%/w of carbon black and 30%/w of PTFE.

16. The method of claim 15, wherein the catalyst support comprises nickel foam or mesh.

\* \* \* \* \*